United States Patent [19]

Mayr et al.

[11] Patent Number: 4,854,668
[45] Date of Patent: Aug. 8, 1989

[54] LIGHT WAVEGUIDE HAVING THREE PROTECTIVE LAYERS OF PLASTIC MATERIAL AND A METHOD OF MANUFACTURE

[75] Inventors: Ernst Mayr, Starnberg; Ulrich Oestreich; Erich Weil, both of Munich, all of Fed. Rep. of Germany

[73] Assignee: Siemens Aktiengesellschaft, Berlin and Munich, Fed. Rep. of Germany

[21] Appl. No.: 177,173

[22] Filed: Apr. 4, 1988

[30] Foreign Application Priority Data

Apr. 14, 1987 [DE] Fed. Rep. of Germany ....... 3712660

[51] Int. Cl.⁴ ............................................. G02B 6/10
[52] U.S. Cl. ................................................. 350/96.30
[58] Field of Search ................ 350/96.29, 96.30, 96.33

[56] References Cited

U.S. PATENT DOCUMENTS 4,334,733 6/1982 Takeshima ..................... 350/96.33

FOREIGN PATENT DOCUMENTS 3002363 3/1983 Fed. Rep. of Germany .

Primary Examiner—William L. Sikes
Assistant Examiner—Robert E. Wise
Attorney, Agent, or Firm—Hill, Van Santen, Steadman & Simpson

[57] ABSTRACT

An optical fiber having a multiple layer coating characterized by the inside layer being composed of a material that is stretched onto the bare fiber. Preferably, the inside layer is applied by extruding a stretch cone and stretching this onto the fiber. An intermediate layer can be applied onto the inside layer, either by a pressure molding system or by a stretched cone method, and an outside layer is applied by another extruder forming a stretched cone.

14 Claims, 1 Drawing Sheet

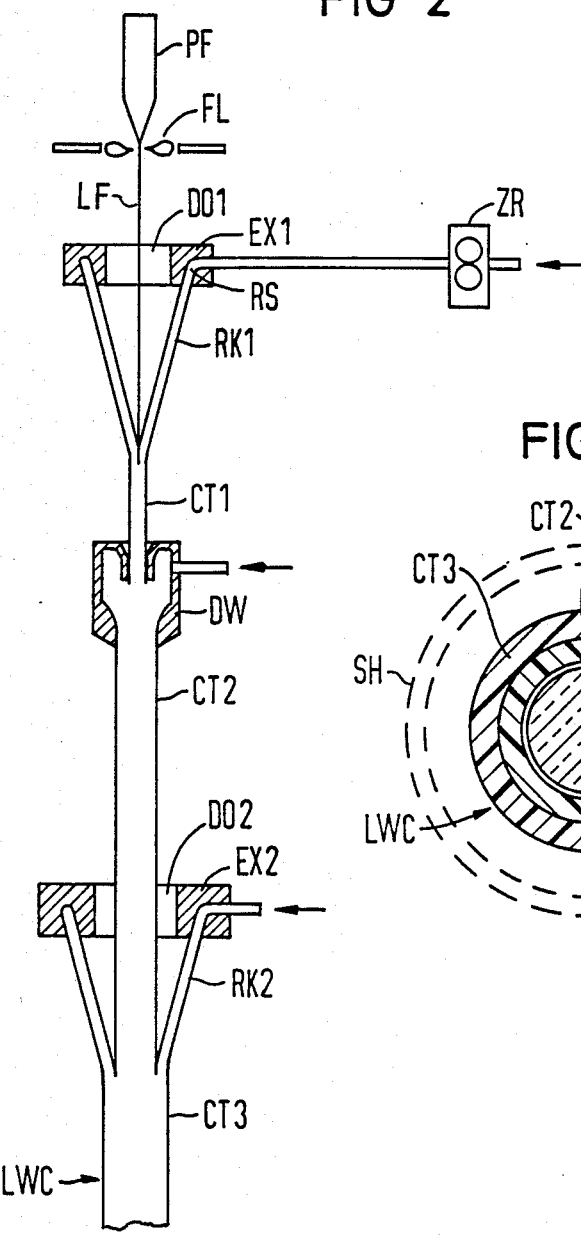

LIGHT WAVEGUIDE HAVING THREE PROTECTIVE LAYERS OF PLASTIC MATERIAL AND A METHOD OF MANUFACTURE

BACKGROUND OF THE INVENTION

The present invention is directed to a light waveguide comprising three layers of plastic material applied to an optical fiber and to the method of manufacturing the waveguide.

U.S. Pat. No. 4,334,733, whose disclosure is incorporated by reference and which claims priority from the same Japanese application as German Patent No. 30 02 362, discloses an optical fiber which has three layers applied to the fiber. An innermost layer or primary coating is composed of a resin coat, which is applied to the bare fiber immediately after drawing the optical fiber by drawing the bare fiber through a cell or container which has the liquid resin mixture. The thickness of this primary coat lies roughly in the range of 10 and 30 μm. A subsequent buffer layer is applied to this primary layer and can be composed of a silicon resin, rubber-like material or the like, and has a wall thickness of between 50 and 200 μm. On the outside of the buffer layer is a third coating or layer, which is a secondary coating that is composed of a relatively hard material and is applied in a melt or flow extrusion method. The planned or desired outside diameter of the light waveguides coated in this way lie in the order of magnitude of approximately 900 μm. This involves a matter of a permanently or firmly enveloped fiber for which the outside diameter is typical.

Devices, that must be very well centered, are needed for the application of the innermost or primary coating. On the other hand, the optical fiber here is still completely unprotected so that guide devices or the like are difficult to use. Moreover, this method is highly dependent on the quality of the centering and damage to or deterioration of the optical fibers can occur, given inadequate centering, particularly when a low wall thickness in the coating is provided. In addition, the viscosity of the resin compound used for the first coating plays a particular part, and this requires that the cell must be appropriately heated. In the known coating with resin compounds in a cell, the applied pressure is of a great influence in order to shorten the draw-in cone in the immediate proximity of the fiber. When this is not observed, gas can be encapsulated by the coating. Another disadvantage of the known arrangement is that, given a modification of the drawing rate, all of the parameters cited above in the primary coating must also be changed, and this potentially leads to considerable adjustment problems.

SUMMARY OF THE INVENTION

The object of the present invention is to provide a way by which a multiple coating of optical fibers optimized in terms of the properties can be achieved, and the coating can be executed, especially beneficially in terms of the production engineering.

This is accomplished by an improvement for a light waveguide comprising a plurality of layers of plastic material applied on an optical fiber, with the improvement being that the inside or primary layer, which is applied directly to the bare optical fiber, is composed of a material which is stretched onto the optical fiber in a longitudinal direction.

Since the inside layer in the invention is applied in a hose stretching or extruding method, special centering procedures are not needed because the stretching cone itself will represent a centering for the optical fiber. The contact between the optical fiber on the one hand and the inside wall of the stretched cone on the other hand does not occur until the last moment, which is a condition in which the stretching cone has already reached its final wall thickness. In the final result, after the conclusion of the primary coating, the correspondingly applied inside coating lies against the optical fiber practically force-free and has a largely uniform wall thickness distributed over the circumference. Thus, the deterioration in the quality of the optical fiber, due to different wall thicknesses in the coating, need not be feared.

The inside layer is expediently extremely thin, with a thickness in the range of 5 to 10 μm, and has a refractive index $\geq 1.5$ at all wave lengths. In addition, the inside or primary layer, when considering temperature, can solidify by cooling directly after application or can be strengthened by cross-linking.

The invention is also directed to a method of applying a plurality of coats of plastic material onto an optical fiber, which is characterized in that the inside layer of the thermoplastic or reactive plastic material is applied in a hose stretching method.

Other features and advantages of the present invention will be readily apparent from the following description of the preferred embodiments, the claims and drawings.

BRIEF DESCRIPTION OF THE DRAWINGS

FIG. 1 is a cross sectional view of a first embodiment of an optical fiber in accordance with the present invention, which fiber is provided with three protective layers; and FIG. 2 is a schematic illustration of an apparatus for applying the three layers and for implementing the method of the present invention.

DESCRIPTION OF THE PREFERRED EMBODIMENTS

The principles of the present invention are particularly useful in a coated light waveguide LVC, which has an outside diameter in the order of magnitude of 250 μm. The coated light waveguide includes an actual optical fiber LF, which has a glass core with a cladding layer of glass, and has an outside diameter in the order of magnitude of 125 μm. It is provided with a first protective layer CT1, which may be called an inside layer or primary layer, and which layer has a wall thickness that lies in the range of between 5 μm and 10 μm. This inside layer CT1 is applied in a hose stretching method, for example, a stretching cone is produced with an extruder, or by an extruded connected to a gear pump ZR, and the optical fiber LF enters into the center of this cone and is coated by the stretching of the cone without exact centering of the cone on the fiber. It is expedient to execute this pass in a vertical direction, insofar as possible.

Polyisobutylene is preferably used as the material for a thermoplastic inside or primary layer CT1. Examples of this type of material are sold by BASF under the trademark "OPPANOL B 10". The layer CT1 can be a long, chained thermoplastic material that does not freeze at the temperature of use and has a refractive index greater than 1.5 for ultraviolet absorption. Also coming into consideration, instead, are hard, ultraviolet-reactive materials, for example, a material sold by De Soto Company under the trade name "UV-Cure 95 4044", and this material is used in a thin layer, which provides anti-abrasion protection and is a light absorber. Other thermoplastics are conceivable.

When being drawn, the wall thickness of the stretch cone is greatly diminished, and only requires a rough centering. A relatively wide tool having an annular gap diameter in the order of 2 mm–4 mm can be used for the extruder head and serves the purpose of forming the stretching cone so that the centering thereof is free of problems. The bore of the entrance aperture or opening DO1 should be in a range of 1–3 mm in diameter.

The material used for the inside layer CT1 should have a refractive index of above 1.5, should adhere well to glass surfaces of the optical fiber LF, but should, nonetheless, be easily removed, either by heating or by being stripped off with a chemical solvent. The material used for the inside layer CT1 should also be optimally age resistant at high temperatures. A potential, slight decentering is relatively uncritical, because of the low or small thickness on the inside layer CT1 that is used.

A second or intermediate layer CT2 is applied onto the primary layer CT1 and has a greater wall thickness, namely in the range of 20 $\mu$m–40 $\mu$m. This intermediate layer CT2 should have a cushioning properties, for example, should be composed of a significantly softer, potentially cross-linkable material than, for example, the inside layer CT1. Silicone acrylates or ultraviolet acrylates that are set especially soft, as well as cellularized, rubber-like material of aliphatic thermoplastics, PU, polyester or other cross-linkable materials are especially suitable for this purpose.

The intermediate layer CT2 is applied in a hose stretching manner or by a pressure coating method. In a pressure coating method, the pressure tool must, in fact, be centered, but can be hingably mounted fashioned. A slight decentering and a seam offset of the cell, as well as potential droplet formation which is generated by surface tension, are less critical because of the covering inside layer and because of the hard outside layer produced in the same work cycle. The same is true of the hose-sprayed or injected extruded spray coated intermediate layer.

The cushioning layer CT2 is expediently roughly 3–14 times as thick as the inside layer CT1.

The hard thermoplastic, or hard UV-elastomer, which has a relatively thin layer, is applied on the intermediate layer CT2 as an outside layer CT3, which provides deformation protection. Examples of materials are PA 12, which is a polyamide having a high aliphatic proportion, a material sold by General Electric under the trade name "ULTEM", and similar hard, but preferably tempterture resistant, materials. Various polyesters can also be used for this purpose. The materials for the outside layer CT3 should be temperature-resistant, to protect the optical fiber LF against deformation, but not be capable of being deformed in a dangerous way given temperature changes and, thus, should be optimally thin. The outer layer CT3 is again applied in a hose-stretching method with the assistance of an extruder. These materials are selected from a group consisting of hard thermoplastic materials selected from a group consisting of polytherimides, polyamide, and polyester.

When the material of the outside layer CT3 at least comprises certain transparency, then the final cross linking of the intermediate layer CT2 can be produced from the outside with the use of ultraviolet light, namely after the completion of the coating process and after the application of the outside layer CT3. The final shaping is, thereby, compelled by the hard outside or cover layer CT3 that, of course, is already hardened immediately after the extrusion process. Problems that otherwise arise, precisely in the application of the thick layer or cushioning layer CT2 are, thus, largely minimized. Partial UV absorption by the hard outside layer CT3 can be compensated by an appropriate increase in the radiation density. As already mentioned, the necessary centering of the hose stretching coatings CT1 and CT3 is largely uncritical because of using the wide injection molding dies, which have a large annular gap.

The wall thicknesses of the outside layers should be selected to be in a range of between 20 $\mu$m and 40 $\mu$m, or about 2–4 times that of the primary layer CT1.

The E-moduli for the individual layers is expediently selected in the following way:

inside layer CT1 has an E-modulus in a range of between 100 and 1,000 N/mm$^2$;

intermediate layer CT2 has an E-modulus in a range of between 0.01 and 1 N/mm$^2$; and the outside layer CTe has an E-modulus between 1,000 and 3,0000 N/mm$^2$.

The substances used for the materials of the layers CT1–CT3 can also be adequately resistant for a long-term temperature above 100° C., but hardly above 120° C. However, they should not pass through any pronounced transformation point up to 40° C., such as, for example, polyimide lacquer and silicone acrylates.

The outside diameters of the triply coated light waveguide LWC expediently lies between 200 $\mu$m and 500 $\mu$m. It thus corresponds to that of a standard single or double coated light waveguide and can, thus, for example, be loosely introduced into a filled or unfilled protective sheath, such as SH (shown in broken lines in FIG. 1), and can, thus, serve for construction of an optical lead having an outside diameter on the order of magnitude of 1 mm–5 mm.

In the manufacturing apparatus of FIG. 2, a fiber preform PF is heated by a heating device, such as flames FL, so that an optical fiber LF, composed of a core and cladding material, can be drawn in a known manner. As illustrated, the fiber LF, after being drawn from the preform PF, passes through an extruder head EX1, which has an aperture DO1 that is designed to be appropriately large, for example in the order of magnitude of 1 mm–3 mm. The extruder head EX1 has an annular gap or nozzle RS through which a stretching cone RK1 is extruded and drawn. As illustrated, the gap diameter of the nozzle RS is in the order of magnitude of 2 mm–4 mm. Due to the extrusion of the cone RK1, its wall thickness increasingly decreases as the distance from the extruder EX1 increases and, finally, it is pulled firmly against the outer surface of the fiber LF and, thus, forms a thin outer layer CT1 that is a "stretched on" layer. Without further auxilliary means, the stretch cone RK1 thereby effects the centering of the optical fiber within a certain range of eccentricity. An especially simple centering is achieved when all of the final processes proceed in a vertical direction, as illustrated.

Compared to a pressure coating, the application of the stretch cone has the advantage that the conveying of the material CT1 can be prescribed with volumetrically metering pump, such as, for example, a gear pump ZR. The dependency on the viscosity is, thus, largely eliminated and a speed-proportional conveying is guaranteed.

The material for the inside layer CT1 can be a thermoplastic or can be a UV reactive material. In the case of UV reacting material, a curing path for ultraviolet light can be inserted prior to reaching the point of applying the second coating. The inside layer or primary layer CT1 can have a small proportion of extremely long chained molecules, for example, in a distribution of 5,000–10,000 and having a maximum proportion of 20%.

A pressure tool DW is provided for applying the intermediate layer CT2. By utilizing the pressure tool a stretching cone does not occur and the coating which does occur is a pressure coating. Alternatively, the intermediate layer CT2 can also be applied with a hose stretching method, as set forth in the case of the primary layer CT1.

The optical fiber provided with the intermediate layer CT2 then proceeds through another extruding head EX2, whose through opening DO2 lies in the order of 3–10 mm. Here, too, a stretching cone RK2 is formed and pulled onto or against the intermediate layer CT2, which is the cushioning layer, and, thus, forms the outside layer CT3. The centering of the outside layer CT3 on the fiber with the first intermediate layers will occur due to the stretching cone RK2 in a manner analogous to the above described centering with the extruder EX1.

Pressure or hose tools can be made hingable when the effective pressures are capable of being held low.

Although various minor modifications may be suggested by those versed in the art, it should be understood that we wish to embody within the scope of the patent granted hereon all such modifications as reasonably and properly come within the scope of our contribution to the art.

We claim:

1. In a light waveguide having a plurality of layers of plastic material applied on an optical fiber, the improvement comprising an inside layer being directly applied to a bare optical fiber and being composed of a material which is stretched onto the bare fiber in a longitudinal direction.

2. In a light waveguide according to claim 1, wherein an outside layer of the plurality of layers is composed of a material which is stretched onto the underlying layer in a longitudinal direction.

3. In a light waveguide according to claim 1, wherein an intermediate layer is composed of a material that is stretched onto the inside layer in a longitudinal direction.

4. In a light waveguide according to claim 1, which has an intermediatee layer applied to the inside layer, said intermediate layer being composed of pressure coated material.

5. In a light waveguide according to claim 1, wherein the inside layer has a wall thickness in a range of between 5 $\mu$m and 20 $\mu$m.

6. In a light waveguide according to claim 1, which has an intermediate layer applied onto the inside layer, said intermediate layer having a wall thickness in a range of between 20 $\mu$m and 140 $\mu$m.

7. In a light waveguide according to claim 1, in which the plurality of layers has an outside layer, said outside layer having a wall thickness in a range of between 20 $\mu$m and 40 $\mu$m.

8. In a light waveguide according to claim 1, which has an inside layer, an intermediate layer, and an outside layer, with the ratio of all thicknesses of the inside layer to the wall thicknesses of the middle layer and to the wall thickness of the outside layer being in a range of between 1:3:2 and 1:15:3.

9. In a light waveguide according to claim 1, wherein the inside layer is composed of a material which is selected from a group of materials consisting of UV-reactive materials and thermoplastic materials.

10. In a light waveguide according to claim 1, wherein the inside layer comprises a material having a small proportion of less than 20% of long-chained molecules, preferably having a chain length of between 5,000 and 10,000.

11. In a light waveguide according to claim 1, wherein the inside layer is composed of a high molecular polyisobutylene.

12. In a light waveguide according to claim 1, which has an intermediate layer disposed on the outer layer, said intermediate layer being composed of a cushioning material.

13. In a light waveguide according to claim 12, wherein the intermediate layer is composed of a silicone acrylate.

14. In a light waveguide according to claim 1, which has an outside layer being composed of a hard, thermoplastic material selected from a group consisting of polyethermide, a polyamide and polyester.

* * * * *